United States Patent [19]

Priesemuth

[11] 4,317,251
[45] Mar. 2, 1982

[54] WINDSHIELD WIPER

[76] Inventor: Wolfgang Priesemuth, Postkamp 13, 221 Itzehoe-Nordoe, Fed. Rep. of Germany

[21] Appl. No.: 177,860

[22] Filed: Jun. 14, 1980

[30] Foreign Application Priority Data

Aug. 17, 1979 [DE] Fed. Rep. of Germany ....... 2933363

[51] Int. Cl.³ .............................................. B60S 1/04
[52] U.S. Cl. ............................ 15/250.41; 15/250.36; 15/250.42
[58] Field of Search .......... 15/250.36, 250.40, 250.41, 15/250.42

[56] References Cited

U.S. PATENT DOCUMENTS

| 1,370,910 | 3/1921 | Pederson | 15/250.41 |
| 2,080,129 | 5/1937 | Gulotta | 15/250.41 |
| 3,631,561 | 1/1972 | Aszkenas | 15/250.41 |
| 4,057,870 | 11/1977 | Priesemuth | 15/250.41 |

FOREIGN PATENT DOCUMENTS 2610941 10/1977 Fed. Rep. of Germany ... 15/250.41

Primary Examiner—Peter Feldman
Attorney, Agent, or Firm—Becker & Becker, Inc.

[57] ABSTRACT

A windshield wiper having two strips of rubber-like material mounted in a separate holder, one on each side of the actual wiper blade, to store and distribute a cleaning fluid over the windshield surface. Each strip is formed with a series of ribs inclined at a shallow angle to the length of the strip, these ribs forming channels which in operation sweep away dirt particles from the windshield before these reach the blade itself. In this way, abrasion of the wiper blade by dirt particles is considerably reduced.

11 Claims, 6 Drawing Figures

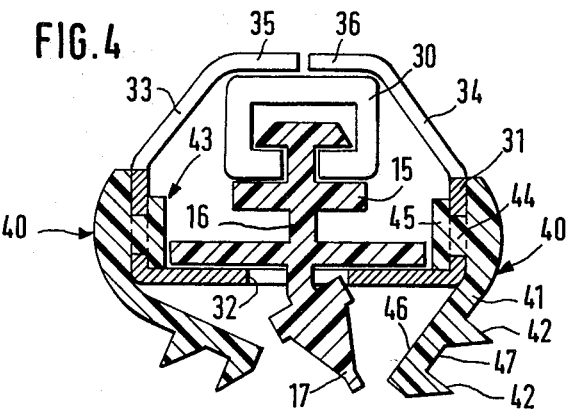
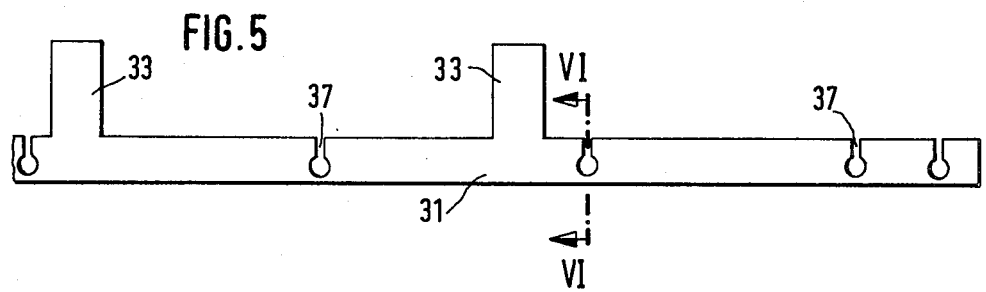
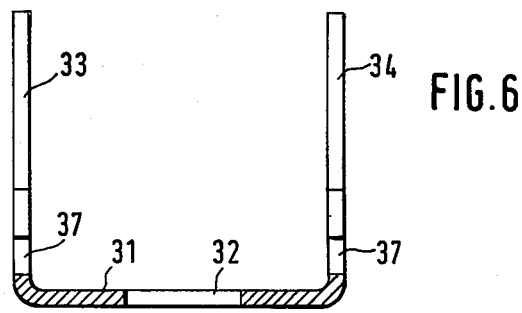

WINDSHIELD WIPER

The present invention relates to windshield wipers, and particularly to a windshield wiper having a wiper blade, which is provided with a wiping lip and is held in spring clips, and a pair of strips, which are disposed one on each side of the wiper blade and are carried by a separate holder, said strips coming to bear against the windshield and comprising rubber-like material, to store and distribute a cleaning fluid.

Such windshield wipers are known, for example from German No. DE-PS 22 52 141, and German No. DE-OS 2 447 923. They have proved generally satisfactory in practice, and may have different forms of construction. Under normal operating conditions, it is known that on the windshield to be cleaned, the proportion of particles of dirt to water is often very great, that is to say, there is not enough water present to clear the windshield, so that damage occurs to the actual rubber windshield wiper blade. The known strips for storing and distributing cleaning fluid overcome the problem of a lack of water because of a honeycombed structure of the strips, which holds large amounts of water and is intended to ensure that the wiped particles of dirt which have remained on the windshield are flushed away. This is of particular importance because the edge of the actual wiper lip, which is dimensioned to tenths and hundredths of a millimeter, will be attacked and destroyed by these particles of dirt and will then fail to clean the windshield satisfactorily, resulting in a streaky motor vehicle windshield. The strips according to this prior art are connected to a steel blade by vulcanizing in place or by adhesion, and the steel blade is held by a plurality of tightening clips.

The object of the present invention is to provide an improved windshield wiper in the nature of a further development of these known windshield wipers, which fulfills its function with a better cleaning effect and is, in addition, simple to handle and economical to produce.

This object, and other objects and advantages of the present invention, will appear more clearly from the following specification in connection with the accompanying drawings, in which:

FIG. 4 is an illustration similar to FIG. 3 of a modified form of embodiment of a windshield wiper with a strip according to the invention;

FIG. 5 shows a side view of the holder for a strip as shown in FIG. 4; and

FIG. 6 is a cross section through the holder of FIG. 5 taken on the line VI—VI of FIG. 5.

Figure 1:
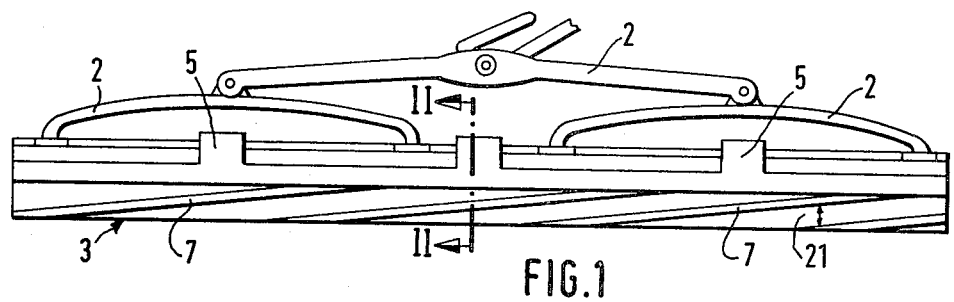
FIG. 1 shows a windshield wiper with strips constructed according to the invention.

The windshield wiper of the present invention is characterized primarily in that the strips include web portions which project toward the windshield surface and are provided with outwardly projecting ribs, the strips being flexible to such an extent that during movement of the windshield wiper, the ribbed outer side of the leading web portions, and the smooth inner side of the trailing web portions, can bear against the windshield.

With the inventive measures, by means of the projecting web portion with lateral ribs, a particularly flexible arrangement is provided which can reliably and satisfactorily pick up and remove the dirt deposited in the immediate vicinity of the actual wiper lip without the dirt coming into contact with the actual wiper blade.

While the ribs extend substantially parallel to the surface of the windshield in the state of rest, the tips of the ribs constructed according to the invention come to bear against the windshield in the operating state, and then form passages. The cleaning fluid is then taken up, together with the particles of dirt, by the passages formed by the ribs, and is conveyed to the outside, as a result of which the windshield to be cleaned is cleaned particularly quickly and thoroughly.

It is further preferred that the strips be received positively, that is replaceably, by the holder. In this manner, the flat steel blade and adhesion can be dispensed with.

A particularly favorable distribution of forces results if the holder has a substantially U-shaped cross section, at the free arms of which there extend recesses, extending over the entire length, to receive base portions of the strips. This construction renders possible a secure attachment, and in addition consists of only one part.

Referring now to the drawings in detail, the fundamental construction of a windshield wiper according to the invention will be described in more detail with reference first to FIG. 1. It essentially comprises a wiper blade (hidden in FIG. 1), spring clips 2, and strips 3. The wiper blade is provided with a plurality of parallel transverse webs 15 (FIG. 3), the uppermost of which is secured in the spring clip 2. The mid-points of the transverse webs 15 are connected to one another by a narrow center web 16 which extends beyond the bottom transverse web to there merge into the actual wiper lip 17. During wiping, the center web 16 and the lip 17 are deformed in such a way that lip 17 tilts and slides with its respective wiping edge 18 over the surface to be cleaned.

The strips 3 constructed according to the invention preferably comprise rubber and are somewhat shorter in length than the center web 16, so that the wiping lip 17 projects somewhat.

Figure 2:
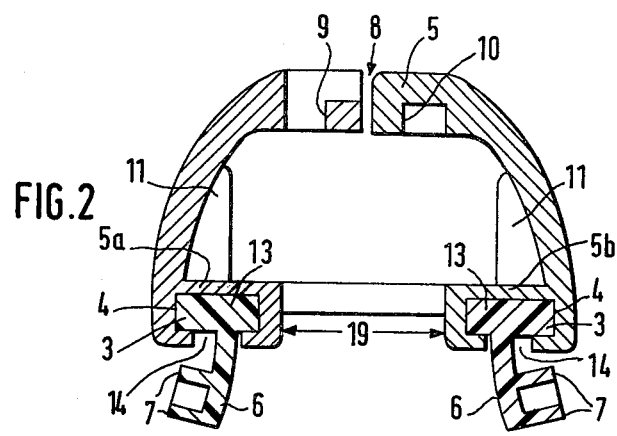
FIG. 2 is a cross section taken on the line II—II in FIG. 1 with the holder open and the strips in the position of rest.

As can be seen particularly clearly from FIG. 2, the strips 3 are positively received by longitudinal recesses 4 of the U-shaped holder 5. The strips 3 are generally T-shaped in cross section, and comprise a base portion 13, which is completely received in the longitudinal recess 4, and a web portion 6, which projects substantially perpendicularly out of the corresponding recess 4 through an opening 14. In this form of embodiment, both webs 6 have a plurality of ribs 7 which, in the state of rest, extend substantially parallel to the surface 23 of the windshield, which is only shown in FIG. 3.

The recesses 4 are disposed in free arms 5a and 5b in the lower region of the holder 5, and extend over their entire length. The strips 3 are so spaced that they leave an elongated center opening 19 through which the wiping lip 17 can be centrally received. The lateral walls 22 of the holder 5 are so designed that they do not hamper the lip 17.

It will be seen from FIG. 2 that in the position of rest, the strips 3 diverge slightly outwardly in a direction away from the base portion 13.

Figure 3:
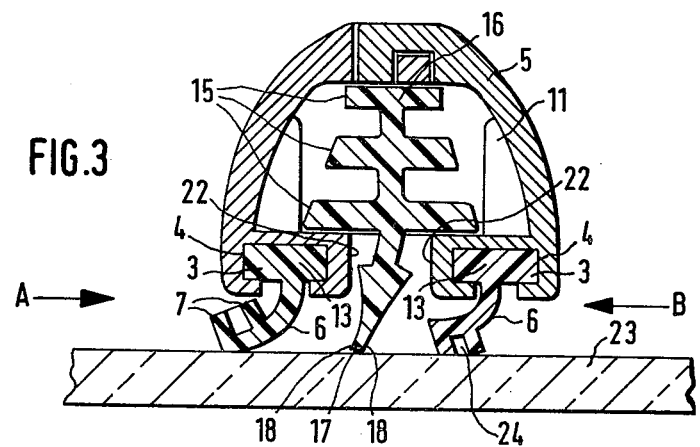
FIG. 3 is a cross section taken on the line II—II in FIG. 1 with the holder hooked together and the strips and wiper blade in movement toward the right.

In the upper region, the holder 5 is formed with two connecting pieces 9 and 10 which can be hooked positively one into the other and which in the position of rest are separated from one another by a slit 8, so that a clip closure is formed which—as FIG. 3 shows—renders possible a firm clip-like connection to the actual windshield wiper.

Spacing webs 11 are constructed in the lateral region of the holder 5 so as to further stiffen the holder 5 and to center the wiper blade.

In FIG. 3, the windshield wiper according to the invention is shown in the operating state as it bears with its wiper lip 17 and the strips 3 against the surface 23 of the windshield. In so doing, the flexible webs 6 are bent laterally inward or outward respectively, as a result of which, at the leading side B, the two ribs 7 come to bear with their tips against the windshield 23, while at the trailing side A and in the same direction of wiping, the ribs 7 are directed away from the windshield 23. With the reverse direction of wiping, a reversal then occurs, so that the ribs 7 at the side A are urged with their tips against the windshield 23. In this manner, a passage 24 is formed in which a large proportion of the particles of dirt are collected and conveyed away to the outside, so that the wiper lip 17 only performs an after-cleaning function and provides a windshield 23 completely free of streaks.

The angle 21 (FIG. 1) between the central longitudinal axis of the strip 3 and the ribs 7 is in the range of 15°–20°.

It is further conceivable to round the ribs 7 slightly at their outer edges, or to make them sawtoothed in accordance with the second form of embodiment of FIG. 4–6.

In the second form of embodiment as shown in FIGS. 4 to 6, an ordinary commercial windshield wiper blade, with transverse webs 15, a longitudinal web 16, and a wiper lip 17, is again anchored in a holder 30 of the actual windshield wiper.

The holder 31 for the strips 40 is, in the present case, a frame of U-shaped section which may comprise metal or plastics material. In its center, this holder 31 comprises a longitudinal slot 32 for passage of the wiper lip 17. Connecting pieces 33 and 34 are distributed over the length of the holder 31, as FIG. 5 shows, and can engage with their ends 35 and 36, which are bent at an angle, behind the holder 30 so as to secure the strips 40 to the actual windshield wiper.

In the present case, too, the strips 40 comprise a web portion 41, which is provided at its outer side 47 with ribs 42 which in the present case have a sawtooth profile. The inner side 46 of the web is smooth.

In order to secure the strips 40, button-like attachments 43 are provided at their inner sides and are distributed over their length at the rear end of the web portions 41. These attachments 43 comprise a neck portion 44, and a button portion 45. These button-like attachments are received by the keyhole-shaped openings 37 illustrated in elevation in FIG. 5 and in section in FIG. 6. The cross-section of the neck portion 44 corresponds to the circular cross section of the openings 37. Because of the resilience of the material of the strips 40, the latter can be inserted in the openings 37 with deformation of their neck portion 44. Such an assembly can be carried out simply and quickly, so that the replacement of the strips 40 does not involve any difficulties.

Apart from this, the windshield wiper shown in FIGS. 4–6 works in precisely the same manner as the windshield wiper shown in FIGS. 1–3. With regard to FIG. 4, however, it should be mentioned that here an intermediate position is illustrated. After a change of movement, during the movement beginning towards the left, the left-hand strip 40, which is now to the fore, is folded inwardly and the wiper lip 17 is laid over the right. On further movement, this right-hand strip, which is still tilted to the left, likewise folds over to the right, so that its inner side 46 or edge comes to bear against the windshield.

The holders preferably comprise a synthetic material having limited resilience, such as polyamide. The strips may be formed of a rubber which is resistant to fuel, oil, grease, and acid.

The present invention is, of course, in no way restricted to the specific disclosure of the specification and drawings, but also encompasses any modifications within the scope of the appended claims.

What I claim is:

1. A windshield wiper, comprising:
   spring clips;
   a wiper blade held by said spring clips and provided with a wiper lip for engaging a windshield;
   a holder; and
   elastomeric strips held by said holder and located on both sides of said wiper blade, said strips being intended for engaging said windshield and for storing and distributing cleaning fluid, said strips including web portions which project toward, and are adapted to engage, said windshield, said web portions including a smooth inner side of trailing web portions and on an outer side of leading web portions being provided with outwardly projecting lateral ribs and having such a flexibility that, during movement of said windshield wiper on said windshield, the ribbed outer side of the leading web portions, and the smooth inner side of the trailing web portions, engage said windshield, said lateral ribs extending at such an angle that when engaging said windshield to be cleaned, they extend at an acute angle to the central longintudinal axis of said strip.

2. A windshield wiper according to claim 1, in which said acute angle is about 15° to 20°.

3. A windshield wiper according to claim 2, in which said ribs have a sawtooth profile.

4. A windshield wiper according to claim 2, in which said strips are provided with a T-shaped base portion, and in which said holder is provided with a correspondingly shaped recess for positively receiving said base portion in such a manner that said strip can be easily replaced.

5. A windshield wiper according to claim 3, in which said strips are provided on their inner sides of their web portions with button-like portions, and in which said holder is provided with keyhole-shaped openings for frictionally and positively receiving said button-like portions.

6. A windshield wiper according to claim 1, in which said holder has a substantially U-shaped cross section over its length, is provided on that side facing said windshield with a longitudinal slot for the passage of said wiper lip of said wiper blade, and on the opposite side is provided with at least two corresponding connecting pieces adapted to be interconnected in a positive hooking manner for fastening on said spring clips.

7. A windshield wiper according to claim 1, in which said holder comprises synthetic material having a limited resilience.

8. A windshield wiper according to claim 7, in which said holder comprises a polyamide.

9. A windshield wiper according to claim 1, in which said strips comprise a rubber which is resistant to fuel, oil, grease and acid.

10. A windshield wiper according to claim 1, which includes spacing webs distributed within said holder over the length thereof for centering said holder on the base of said wiper blade.

11. A windshield wiper according to claim 1, in which said strips are profiled in such a way that they diverge slightly outwardly relative to their bases without the action of external forces, i.e., in a position of rest.

* * * * *